United States Patent [19]

Nakamura et al.

[11] Patent Number: 4,926,902

[45] Date of Patent: May 22, 1990

[54] PRESSURE EQUALIZER VALVE DEVICE OF FUEL INJECTION PUMP

[75] Inventors: Hisashi Nakamura; Satoshi Takahashi; Takayuki Ikeda; Masaaki Ogino, all of Saitama, Japan

[73] Assignee: Diesel Kiki Co., Ltd., Japan

[21] Appl. No.: 298,104

[22] Filed: Jan. 17, 1989

[30] Foreign Application Priority Data

| | | | |
|---|---|---|---|
| Jan. 18, 1988 | [JP] | Japan | 63-3821[U] |
| Jul. 4, 1988 | [JP] | Japan | 63-165049 |
| Nov. 14, 1988 | [JP] | Japan | 63-147587[U] |
| Nov. 14, 1988 | [JP] | Japan | 63-285734 |

[51] Int. Cl.⁵ .......... F16K 17/18

[52] U.S. Cl. .......... 137/493.3; 123/467; 137/493.6; 137/493.9; 417/296

[58] Field of Search .......... 137/493.1, 493.5, 493.9, 137/512.2, 493.4, 493.6, 493.3; 123/467; 417/296

[56] References Cited

U.S. PATENT DOCUMENTS

| | | | |
|---|---|---|---|
| 807,269 | 12/1905 | Hildebrand | 137/512.2 X |
| 3,479,999 | 11/1969 | Keller et al. | 137/512.2 |
| 4,467,767 | 8/1984 | Kampichler et al. | 123/467 |
| 4,577,606 | 3/1986 | Böhringer et al. | |
| 4,648,369 | 3/1987 | Wannenwetsch | 123/467 |
| 4,651,779 | 3/1987 | Filippi et al. | |
| 4,692,102 | 9/1987 | Häfele et al. | |

FOREIGN PATENT DOCUMENTS

| | | | |
|---|---|---|---|
| 1201210 | 12/1959 | France | 137/512.2 |
| 62-243965 | 10/1987 | Japan | |

*Primary Examiner*—Stephen M. Hepperle
*Attorney, Agent, or Firm*—Ostrolenk, Faber, Gerb & Soffen

[57] ABSTRACT

A pressure equalizer valve device incorporated in a fuel delivery valve assembly for use in a fuel injection pump, the fuel delivery valve assembly having a valve chamber and a delivery valve member axially movable in part within the valve chamber, the pressure equalizer valve device including a hollow equalizer valve casing member secured to the delivery valve member and having a valve seat surface portion, an equalizer valve element movable into and out of a position seated on the valve seat surface portion, a spring seat member engaging the equalizer valve element, and a helical compression spring seated at one end on the spring seat member and at the other within the delivery valve member, wherein the equalizer valve element, the spring seat member and the spring are all accommodated within the equalizer valve casing member.

23 Claims, 10 Drawing Sheets

PRESSURE EQUALIZER VALVE DEVICE OF FUEL INJECTION PUMP

FIELD OF THE INVENTION

The present invention relates to a fuel injection pump for use typically in a fuel delivery system of an internal combustion engine and, more particularly, to a pressure equalizer valve device incorporated in a fuel injection pump of the type including a fuel delivery valve assembly.

DESCRIPTION OF THE PRIOR ART

A fuel delivery valve assembly provided in a fuel delivery system of an internal combustion engine is used to control the fuel communication from a fuel injection pump to fuel injection nozzles respectively disposed in the individual power cylinders of the engine or in the intake ports of the power cylinders. During intake stroke of a power cylinder, fuel is directed from the fuel injection pump to the fuel injection nozzle unit for the power cylinder through the fuel delivery valve assembly associated with the fuel injection nozzle unit. After a prescribed quantity of fuel is thus supplied through the fuel delivery valve assembly to the fuel injection nozzle unit, the fuel delivery valve assembly blocks the communication between the fuel injection pump and the particular fuel injection nozzle unit to prevent fuel from flowing back from the fuel injection nozzle unit toward the fuel injection pump. The fuel pressure which has once been developed between the fuel delivery valve assembly and the associated fuel injection nozzle unit is thus confined therebetween so that fuel can be pumped to the fuel injection nozzle unit with a minimum of delay during the subsequent intake stroke of the power cylinder.

To enable the fuel injection nozzle unit to cease injection of fuel at a correct timing and to prevent leakage or secondary injection of fuel from the fuel injection nozzle unit upon termination of each cycle of fuel injection, the fuel delivery valve assembly ordinarily has an additional function to take up an excess of fuel pressure which may occur between the fuel delivery valve assembly and the fuel injection nozzle unit. To assist the fuel delivery valve assembly in carrying out such an additional function, the fuel delivery valve assembly has incorporated therein a fuel pressure regulator called fuel pressure equalizer valve adapted to regulate the fuel pressure confined between the fuel delivery valve assembly and the associated fuel injection nozzle unit subsequently to each intake stroke of the power cylinder. A representative example of such a pressure equalizer valve device is disclosed in Japanese Provisional Patent Publication (Kokai) N0. 60-119366.

FIG. 1 of the drawings shows the general construction of the fuel delivery valve assembly taught in this Publication.

The fuel delivery valve assembly herein shown, designated in its entirety by reference numeral 12, forms part of a fuel injection pump of an automotive internal combustion engine and has a delivery valve housing 14 secured to or integral with the housing structure 16 of the fuel injection pump. The delivery valve housing 14 has a generally cylindrical axial bore forming a main valve chamber 18 and an end wall portion 20 formed with a fuel outlet port 22. The fuel outlet port 22 is open at one end to the axial bore in the delivery valve housing 14 and communicates at the other with a fuel injection nozzle unit 24 through a fuel feed passageway 26. To the inner face of the end wall portion 20 of the delivery valve housing 14 is attached a stop member 28 which forms part of the pressure equalizer valve device to be described. As well known in the art, the fuel injection nozzle unit 24 is one of a plurality of such units provided respectively in association with the power cylinders (not shown) of an internal combustion engine and, thus, projects directly into one of the power cylinders or into the intake port of the cylinder.

The delivery valve housing 14 is open at its end opposite to the end wall portion 20 and is communicable with a fuel distribution passageway 30 leading from the delivery port (not shown) of the fuel injection pump. The fuel delivery valve assembly 12 is thus operative to control the communication between the fuel distribution passageway 30 and the valve chamber 18 in the delivery valve housing 14 to allow or block a flow of fuel from the fuel distribution passageway 28 into the delivery valve chamber 18 in the delivery valve housing 14. A flow of fuel allowed from the fuel distribution passageway 28 into the delivery valve chamber 18 in the delivery valve housing 14 is directed through the fuel outlet port 22 in the delivery valve housing 14 and by way of the fuel feed passageway 26 to the fuel injection nozzle unit 24 for injection into the power cylinder of the engine or into the intake port of the cylinder.

The fuel delivery valve assembly 12 comprises a generally cylindrical valve seat member 32 forced into the delivery valve chamber 18 in the delivery valve housing 14 from the end of the bore 18 contiguous to the fuel distribution passageway 30. The valve seat member 32 has an axial bore 34 having an inlet end open to the fuel distribution passageway 30 and an outlet end open to the delivery valve chamber 18 in the delivery valve housing 14. A unitary valve member 36 extends in part through the delivery valve chamber 18 in the delivery valve housing 14 and in part through the axial bore 34 in the valve seat member 32. More specifically, the valve member 36 has a tubular stem portion 38 projecting into the axial bore 34 in the valve seat member 32, and an intermediate land portion 40 merging out of the stem portion 38 away from the inlet end of the axial bore 34. The valve seat member 32 further has a generally cylindrical, hollow sleeve portion 42 axially extending from the land portion 40 into the delivery valve chamber 18 in the delivery valve housing 14 toward the stop member 28 attached to the end wall portion 20 of the delivery valve housing 14.

The stem portion 38 of the valve member 36 has an axial fuel return passageway 44 open to the axial bore 34 in the valve seat member 32 in the vicinity of the inlet end of the bore 34 and has a plurality of blades 46 projecting radially outwardly from the stem portion 38. These blades 46 are spaced apart from each other about the center axis of the stem portion 38 and form a plurality of passageway portions 48 extending from the vicinity of the inlet end of the axial bore 34 toward the intermediate land portion 40 of the valve member 36. This intermediate land portion 40 of the valve member 36 has one of its circumferential edges chamfered or bevelled to form an annular valve face 50 engageable with the circumferential edge which the valve seat member 32 has at the outlet end of its axial bore 34. The other circumferential edge of the land portion 38 defines an outer annular end face 52 spaced apart from the stop member 28 on the end wall portion 20 of the delivery valve housing 14. The sleeve portion 40 extending from such a land portion 38 has an axial bore forming an auxiliary valve chamber 54 communicating with the fuel return passageway 44 in the stem portion 38 through an axial bore 56 formed in the land portion 40. The land portion 40 further has a flat internal annular end face 58 defined between its axial bore 56 and the valve chamber 54 in the sleeve portion 42.

The valve member 36 having the stem portion 38, land portion 40 and sleeve portion 42 each configured as hereinbefore described is axially movable in opposite directions with respect to the valve seat member 32 partially within the delivery valve chamber 18 in the delivery valve housing 14 and partially within the axial bore 34 in the valve seat member 32. Thus, the valve member 36 is movable in a first direction toward the inlet end of the axial bore 34 in the valve seat member 32 to have the annular valve face 50 of its land portion 40 seated on the circumferential edge which the valve seat member 32 has at the outlet end of the axial bore 34. The land portion 40 of the valve member 36 having the annular valve face 50 thus seated on the circumferential edge of the valve seat member 32 blocks the communication between the delivery valve chamber 18 in the delivery valve housing 14 and the axial bore 34 in the valve seat member 32 or the passageway portions 48 defined by the blades 46 on the stem portion 38. The valve member 36 is further movable in a second direction away from the inlet end of the axial bore 34 to have the annular valve face 50 of its land portion 40 unseated from the circumferential edge which the valve seat member 32 has at the outlet end of the axial bore 34. The land portion 40 of the valve member 36 having the annular valve face 50 thus unseated from the circumferential edge of the valve seat member 32 allows communication between the delivery valve chamber 18 in the delivery valve housing 14 and the axial bore 34 in the valve seat member 32 or the passageway portions 48 between the blades 46 on the stem portion 38. The valve member 36 is urged to move in the first direction with respect to the valve seat member 32 by suitable biasing means which is herein shown comprising a preloaded helical compression spring 60. The spring 60 is seated at one end on the annular end face 52 of the land portion 40 of the valve member 36 and at the other on the stop member 28 attached to the end wall portion 20 of the delivery valve housing 14.

In the auxiliary valve chamber 54 formed by the axial bore in the sleeve portion 42 of the valve member 36 is disposed a pressure equalizer valve device 62 which is adapted to function as a fuel pressure regulator. Such a pressure equalizer valve device 62 includes a tubular valve seat member 64 which is in part secured into the sleeve portion 42 of the valve member 36 and formed with an orifice 66 which is open at one end to the auxiliary valve chamber 54 in the sleeve portion valve seat member 42 and at the other into the main delivery valve chamber 18 in the delivery valve housing 14. The valve seat member 64 of the pressure equalizer valve device 62 has an inner end face spaced apart from the internal annular end face 58 of the land portion 40 of the valve member 36 and, at its inner axial end, has a radially inner circumferential edge forming an annular valve seat 68. Engageable with this annular valve seat 68 of the valve seat member 64 is a spherical valve element 70 movable in opposite directions with respect to the valve seat member 64 axially within the valve chamber 54 in the sleeve portion 42 of the valve member 36. The valve element 70 is thus movable in a first direction into a position seated on the annular valve seat 68 of the valve seat member 64 and in a second direction out of the position seated on the valve seat member 64. When moved in the first direction with respect to the valve seat member 64 and seated on the annular valve seat 68 of the valve seat member 64, the valve element 70 blocks the communication between the orifice 66 in the valve seat member 64 and the valve chamber 54 in the sleeve portion 42 of the valve member 36. When moved in the second direction and unseated from the annular valve seat 68 of the valve seat member 64, the valve element 70 allows communication between the orifice 66 in the valve seat member 64 and the valve chamber 54 in the sleeve portion 42 of the valve member 36.

The valve element 70 is received on a spring seat member 72 which is also located within the valve chamber 54 in the sleeve portion 42 of the valve member 36. A helical compression spring 74 is seated at one end on the internal annular end face 58 of the land portion 40 of the valve member 36 and at the other on the opposite end face of the spring seat member 72. The spring seat member 72 and spring 74 are thus operative to urge the valve element 70 to move in the first direction with respect to the valve seat member 64. The valve seat member 64 is securely held in position with respect to the sleeve portion 42 of the valve member 36 with the sleeve portion 42 radially caulked onto the valve seat member 64 as indicated at 76.

During intake stroke of the engine cylinder with which the fuel delivery valve assembly 12 is associated, a fuel pressure is developed in the fuel distribution passageway 30 and acts on valve member 36 of the fuel delivery valve assembly 12 to urge the valve member 36 to move in the second direction with respect to the valve seat member 32. The force resulting from the fuel pressure thus acting on the valve member 36 is opposed by the force exerted by the spring 60 so that, when the former overcomes the latter, the valve member 36 is forced to move in the second direction with respect to the valve seat member 32 and has the annular valve face 50 of its land portion 40 unseated from the valve seat member 32. The annular valve face 50 of the land portion 40 being thus spaced apart from the valve seat member 32, communication is established from the axial bore 34 in the valve seat member 32 or the passageway portions 48 defined by the blades 46 on the stem portion 38 of the valve member 36 to the delivery valve chamber 18 in the delivery valve housing 14. The fuel pumped to the fuel distribution passageway 30 is thus allowed to flow through the passageway portions 48 into the main delivery valve chamber 18 in the delivery valve housing 14 and is directed through the fuel outlet port 22 in the delivery valve housing 14 and by way of the fuel feed passageway 26 to the fuel injection nozzle unit 24, from which the fuel is injected into the power cylinder of the engine or into the intake port of the cylinder.

When the fuel delivery valve assembly 12 is maintained open with the land portion 40 of the valve member 36 unseated from valve seat member 32, the spherical valve element 70 of the pressure equalizer valve device 62 is subjected to the fuel pressure developed in the auxiliary valve chamber 54 through the fuel return passageway 44 in the stem portion 38 of the valve member 36 and the fuel pressure developed in the main delivery valve chamber 18 through the passageway portions 48 between the blades 46 on the stem portion 38. The fuel pressures act in opposite directions on the valve element 70 and are accordingly cancelled by each other so that the valve element 70 is forced against the annular valve seat 68 of the valve seat member 64 by the force of the associated spring 74.

The fuel pressure in the fuel distribution passageway 30 thereafter declines and accordingly the force resulting from the fuel pressure acting on the valve member 36 is overcome by the force of the spring 60. Under this condition, the valve member 36 is caused to move in the first direction with respect to the valve seat member 32 by the force of the spring 60 and has the annular valve face 50 of its land portion 40 seated on the valve seat member 32 as shown. The land portion 40 of the valve member 36 having its annular valve face 50 thus seated on the valve seat member 32 blocks the communication from the axial bore 34 in the valve seat member 32 or the passageway portions 48 between the blades 46 on the stem portion 38 of the valve member 36 to the delivery valve chamber 18 in the delivery valve housing 14. The fuel remaining in the main delivery valve chamber 18 is in this manner prevented from returning to the fuel distribution passageway 30 past the land portion 40 of the valve member 36.

After the fuel delivery valve assembly 12 is closed and accordingly the fuel in the main delivery valve chamber 18 is prevented from returning to the fuel distribution passageway 30 past the land portion 40 of the valve member 36, there is developed in the main delivery valve chamber 18 a fuel pressure "reflected" from the fuel injection nozzle unit 24. The reflected fuel pressure is transmitted backwardly through the fuel feed passageway 26 and acts on the valve element 70 of the pressure equalizer valve device 62 through the orifice 66 in the valve seat member 64 and urges the valve element 70 away from the annular valve seat 68 of the valve seat member 64. The force resulting from the fuel pressure thus acting on the valve element 70 through the orifice 66 in the valve seat member 64 is opposed by the force of the spring 74 so that, when the former overcomes the latter, the valve element 70 is forced out of contact with the annular valve seat 68 of the valve seat member 64 and establishes communication between the orifice 66 in the valve seat member 64 and the valve chamber 54 in the sleeve portion 42 of the valve member 36. With the valve element 70 thus unseated from the valve seat 68 of the valve seat member 64, the fuel in the main delivery valve chamber 18 is allowed to flow through the orifice 66 in the valve seat member 64 and past the valve element 70 into the auxiliary valve chamber 54 and to return to the fuel distribution passageway 30 until the pressure equalizer valve device 62 is thereafter caused to close responsive to declining of the reflected fuel pressure.

In the prior-art pressure equalizer valve device 62 constructed and arranged as hereinbefore described, the fuel pressure (herein referred to as valve opening fluid pressure) effective to cause the valve element 70 to move out of contact with the valve seat 68 of the valve seat member 64 depends on the force which is imparted to the valve element 70 by the compression spring 74 engaging the valve element 70 through the spring seat member 72. During assemblage of the fuel injection pump including such a pressure equalizer valve device 62, the spring 74, spring seat member 72, valve element 70 and valve seat member 64 to form the pressure equalizer valve device 62 are fitted to the valve member 36 in a manner to enable the spring 74 to impart a proper force to the valve element 70 with the spring seat member 72 correctly engaged by the valve element 70. After the component parts of the pressure equalizer valve device 62 are thus assembled to the valve member 36, the pressure equalizer valve device 62 is checked for valve opening fluid pressure and engagement between the valve element 70 and spring seat member 72 to make adjustment of the relative positions of the component parts or any of the component parts of the pressure equalizer valve device 62 if it is determined that such adjustment is necessary. The inspection of the valve opening fluid pressure and the engagement between the valve element 70 and spring seat member 72 could not be made before all the component parts of the pressure equalizer valve device 62 have been assembled to the valve member 36 with the valve seat member 64 secured to the valve member 36 as by caulking of the sleeve portion 42 of the valve member 36 to the valve seat member 54. For this reason and because, in addition, of the fact that the caulking of the valve member 36 to the valve seat member 64 ma cause undue axial displacement of the valve seat member 64 with respect to the valve member 36, difficulties are encountered in achieving a correct valve opening fluid pressure and proper engagement between the valve element 70 and spring seat member 72 in the prior-art pressure equalizer valve device 62 of the described construction.

The present invention contemplates provision of an improved pressure equalizer valve device which can be easily and accurately checked for valve opening fluid pressure and engagement between the valve element and spring seat member before all the component parts of the pressure equalizer valve device are assembled together or fitted into the fuel delivery valve assembly.

In the meantime, a fuel delivery valve assembly used in a fuel injection pump of the in-line type has an adequate space available for the accommodation of the return spring of the pressure equalizer valve device within the fuel delivery valve assembly. In the case, however, of a fuel delivery valve assembly for use in a low-capacity fuel injection pump of typically the distribution type, there is a serious space requirement for the accommodation of the return spring of the pressure equalizer valve device within the valve member of the fuel delivery valve assembly. This is because of the fact that the pressure equalizer valve device incorporated in a low-capacity fuel injection pump is required to offer a valve opening fluid pressure of the order comparable to that of the valve opening fluid pressure to be achieved in a fuel injection pump of the in-line design. A practical expedient to meet such a serious space requirement in a fuel delivery valve assembly incorporated in a fuel injection pump of the distribution type is inevitably to use a helical compression spring having a relatively large length-to-diameter ratio.

A helical compression spring which is disproportionately long for its diameter is liable to buckle between its opposite ends when the spring is subjected to a compressive force exerted by the valve element being moved to an open position. The spring thus caused to buckle may be brought into sliding contact with the inner peripheral surface of the valve member within which the spring is accommodated. A sliding friction repeatedly created by such contact between the spring and the inner peripheral surface of the valve member will promote wear and abrasion of the spring and may result in deviation of the performance characteristics of the spring from those adjusted during assemblage of the pressure equalizer valve device.

SUMMARY OF THE INVENTION

It is, accordingly, an important object of the present invention to provide in a fuel injection pump including a fuel delivery valve assembly, an improved pressure equalizer valve device which can be checked for valve opening fluid pressure and engagement between the valve element and spring sea member before all the component parts of the pressure equalizer valve device are assembled together or fitted into the fuel delivery valve assembly.

It is another important object of the present invention to provide in a fuel injection pump including a fuel delivery valve assembly, an improved pressure equalizer valve device in which the valve opening fluid pressure and engagement between the valve element and spring seat member can be easily examined and accurately adjusted before the individual component parts of the pressure equalizer valve device are assembled together or fitted into the fuel delivery valve assembly.

It is still another important object of the present invention to provide in a fuel injection pump including a fuel delivery valve assembly, an improved pressure equalizer valve device having an adequate space available for the accommodation of the helical compression spring of the pressure equalizer valve device within the fuel delivery valve assembly.

It is, yet, still another important object of the present invention to provide in a fuel injection pump including a fuel delivery valve assembly, an improved pressure equalizer valve device in which the helical compression spring accommodated within the fuel delivery valve assembly is effectively precluded from being caused to buckle and brought into sliding contact with the inner peripheral surface of the valve member within which the spring is in part located.

In accordance with one outstanding aspect of the present invention, there is provided a pressure equalizer valve device incorporated in a fuel delivery valve assembly for use in a fuel injection pump, the fuel delivery valve assembly having a valve chamber and a delivery valve member axially movable in part within the valve chamber, the pressure equalizer valve device comprising (a) a hollow equalizer valve casing member secured to the delivery valve member and having a valve seat surface portion and a valve chamber open in the delivery valve member, (b) an equalizer valve element movable into and out of a position seated on the valve seat surface portion, and (c) biasing means engaging the equalizer valve element and located in part within the delivery valve member for urging the equalizer valve element against the valve seat surface portion of the equalizer valve casing member, (d) wherein the equalizer valve element and at least a portion of the biasing means are accommodate within the valve chamber in the equalizer valve casing member.

In a pressure equalizer valve device thus constructed and arranged in accordance with the present invention, the biasing means may comprise (c/1) a spring seat member engaging the equalizer valve element, and (c/2) a helical compression spring seated at one end on the spring seat member and at the other within the delivery valve member for urging the equalizer valve element against the valve sea surface portion of the equalizer valve casing member.

In accordance with another outstanding aspect of the present invention, there is provided a pressure equalizer valve device incorporated in a fuel delivery valve assembly for use in a fuel injection pump, the fuel delivery valve assembly having a valve chamber and a delivery valve member axially movable in part within the valve chamber, the pressure equalizer valve device comprising (a) a hollow equalizer valve casing member secured to the delivery valve member and having a valve seat surface portion and a valve chamber open in the delivery valve member, (b) an equalizer valve element movable into and out of a position seated on the valve seat surface portion, (c) a spring seat member engaging and movable with the equalizer valve element, and (d) a helical compression spring seated at one end on the spring seat member and at the other within the delivery valve member for urging the equalizer valve element against the valve seat surface portion of the equalizer valve casing member, (e) wherein the equalizer valve element, the spring seat member and the helical compression spring are all accommodated within the valve chamber in the equalizer valve casing member.

In a pressure equalizer valve device thus constructed and arranged in accordance with the present invention, the delivery valve member of the fuel delivery valve assembly is preferably formed with an axial concavity having an axial portion of the equalizer valve casing member closely received therein. In this instance, the pressure equalizer valve device further comprising displacement limiting means limiting the axial displacement of the equalizer valve casing member within the axial concavity in the delivery valve member, the equalizer valve casing member being held in axially abutting engagement with the displacement limiting means at its end opposite to the valve seat surface portion.

A pressure equalizer valve device in accordance with the present invention may further comprise an additional spring seat member fixedly located within the delivery valve member. In this instance, the helical compression spring is seated at one end on the spring seat member engaging the equalizer valve element and at the other on the additional spring seat member, and the displacement limiting means comprises a surface portion of the additional spring seat member.

In accordance with still another outstanding aspect of the present invention, there is provided a pressure equalizer valve device incorporated in a fuel delivery valve assembly for use in a fuel injection pump, the fuel delivery valve assembly having a valve chamber and a delivery valve member axially movable in part within the valve chamber, the pressure equalizer valve device comprising (a) a hollow equalizer valve casing member secured to the delivery valve member and having a valve seat surface portion, (b) an equalizer valve element movable into and out of a position seated on the valve seat surface portion, (c) a spring seat member engaging the equalizer valve element, and (d) a helical compression spring seated at one end on the spring seat member and at the other within the delivery valve member for urging the equalizer valve element against the valve seat surface portion of the equalizer valve casing member, (e) wherein the equalizer valve element and the spring seat member are accommodated within the equalizer valve casing member and the helical compression spring is accommodated in part within the equalizer valve casing member and axially projects out of the equalizer valve casing member into the delivery valve member.

In a pressure equalizer valve device thus constructed and arranged in accordance with the present invention, the delivery valve member of the fuel delivery valve assembly may be formed with an axial concavity having the equalizer valve casing member closely received therein. In this instance, the delivery valve member has a first inner peripheral surface portion defining a cylindrical axial portion of the axial concavity in the delivery valve member, a substantially flat internal surface portion located at one end of the axial concavity, and a second inner peripheral surface portion contiguous at one axial end to the flat internal surface portion and smaller in diameter than the first inner peripheral surface portion of the delivery valve member, the second inner peripheral surface portion defining another cylindrical axial portion of the axial concavity, the equalizer valve casing member having a cylindrical wall portion axially extending toward the flat internal surface portion of the delivery valve member, wherein the helical compression spring havs an axial end portion received in the cylindrical wall portion of the equalizer valve casing member, another axial end portion received in the cylindrical wall portion defined by the second inner peripheral surface portion of the delivery valve member, and a longitudinally intermediate axial portion radially spaced apart from the first inner peripheral surface portion of the delivery valve member.

Where the delivery valve member of the fuel delivery valve assembly is formed with a axial concavity having the equalizer valve casing member closely received therein in a pressure equalizer valve device according to the second outstanding aspect of the present invention, the delivery valve member may alternatively have a first inner peripheral surface portion defining a cylindrical axial portion of the axial concavity in the delivery valve member, a substantially flat internal surface portion located at one end of the axial concavity, a second inner peripheral surface portion contiguous at one axial end to the flat internal surface portion and smaller in diameter than the first inner peripheral surface portion of the delivery valve member, the second inner peripheral surface portion defining another cylindrical axial portion of the axial concavity, and an internal tapered annular surface portion radially tapered from the first inner peripheral surface portion to the second inner peripheral surface portion of the valve member.

BRIEF DESCRIPTION OF THE DRAWINGS

The advantages of a pressure equalizer valve device according to the present invention will be more clearly appreciated from the following description taken in conjunction with the accompanying drawings in which like reference numerals designate similar or corresponding units, members and portions and in which.

DESCRIPTION OF THE PREFERRED EMBODIMENTS

Figure 1:
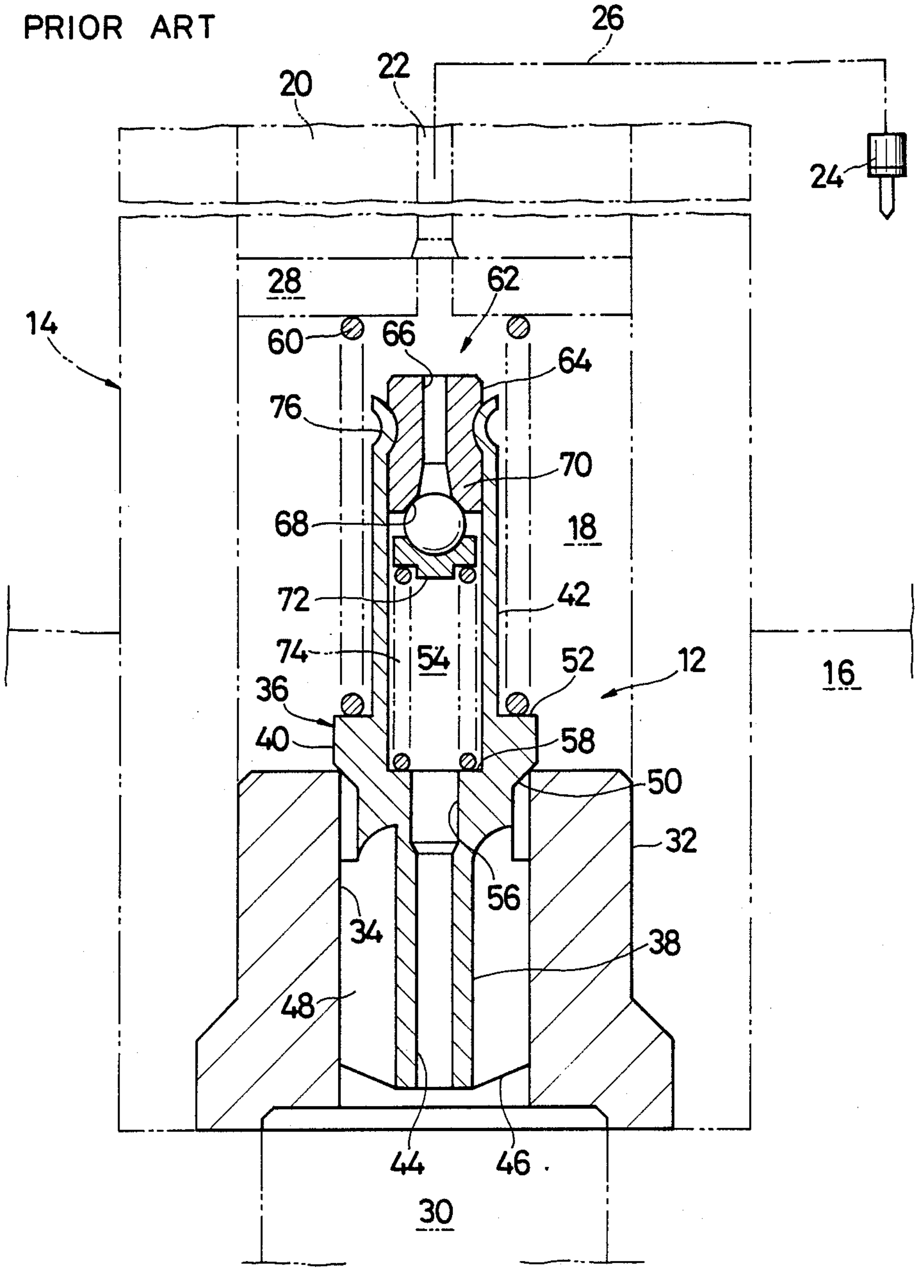
FIG. 1 is a longitudinal sectional view showing a fuel delivery valve assembly forming part of a fuel injection pump and including a known pressure equalizer valve device.

A pressure equalizer valve device according to the present invention forms part of a fuel delivery valve assembly incorporated in a fuel injection pump for use typically in an automotive internal combustion engine. In the following description, the fuel delivery valve assembly including a pressure equalizer valve device embodying the present invention will be assumed to be per se similar in construction to that of a fuel delivery valve assembly using a known pressure equalizer valve device. For this reason, no further description will be made in regard to the construction and arrangement of the fuel delivery valve assembly into which a pressure equalizer valve device embodying the present invention is incorporated. In FIGS. 2 to 10 which show various preferred embodiments of a pressure equalizer valve device according to the present invention, the respective counterparts of those units, members and portions of the fuel delivery valve assembly described with reference to FIG. 1 are denoted by like reference numerals.

Figure 2:
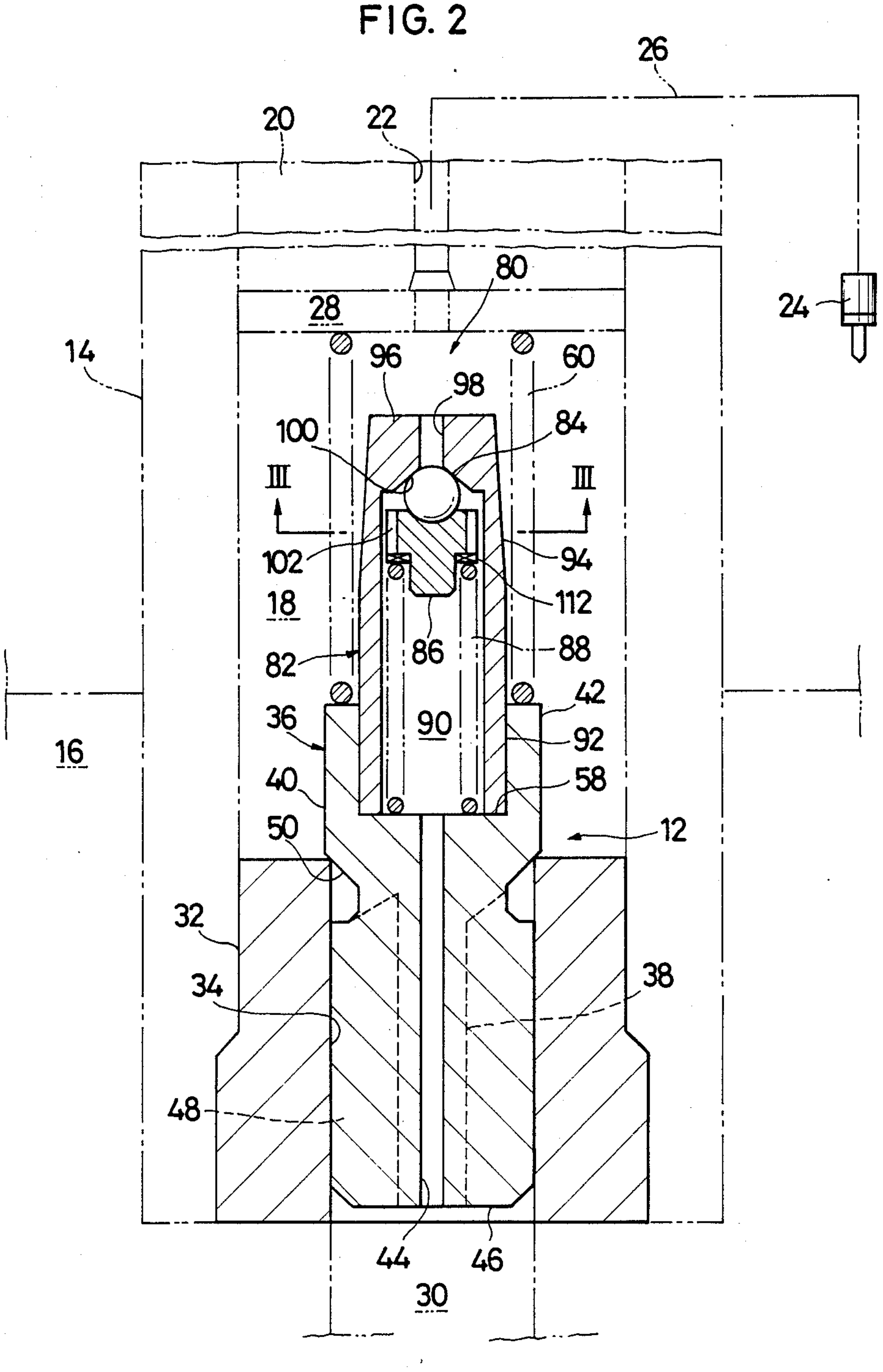
FIG. 2 is a view similar to FIG. 1 but shows a fuel delivery valve assembly including a preferred embodiment of a pressure equalizer valve device according to the present invention.

Referring now to FIG. 2, a first preferred embodiment of a pressure equalizer valve device according to the present invention is thus assumed to form part of a fuel delivery valve assembly 12 constructed and arranged similarly to its counterpart in the fuel injection pump described with reference to FIG. 1. As to the fuel delivery valve assembly 12 herein shown, it may be simply noted that the sleeve portion 42 of the valve member 36 is significantly shorter than that of the valve member 36 in the fuel delivery valve assembly 12 described with reference to FIG. 1.

The pressure equalizer valve device embodying the present invention, now designated in its entirety by reference numeral 80, largely comprises a generally cylindrical, hollow equalizer valve casing member 82, a spherical valve element 84, a spring seat member 86 and a preloaded helical compression return spring 88. The hollow equalizer valve casing member 82 has an axial bore forming an auxiliary equalizer valve chamber 90 having accommodated therein the valve element 84, spring seat member 86 and return spring 88 and communicating with the fuel return passageway 44 in the stem and land portions 38 and 40. The equalizer valve casing member 82 comprises a cylindrical shank portion 92 axially secured into the sleeve portion 42 of the valve member 36 and a intermediate axial portion 94 merging out of the shank portion 90 away from the valve member 36. The intermediate axial portion 94 terminates in and is slightly tapered toward an end wall portion 96 formed with an orifice 98 which is open at one end to the auxiliary equalizer valve chamber 90 in the sleeve portion valve seat member 42 and at the other into the main delivery valve chamber 18 in the delivery valve housing 14. The end wall portion 96 of the equalizer valve casing member 82 has an inner end face spaced apart from the flat internal annular end face 58 of the land portion 40 of the valve member 36 and, at its inner axial end, has a radially inner circumferential edge chamfered or bevelled to form an annular valve seat 100. It may be herein noted that the flat internal annular end face 58 of the land portion 40 of the valve member 36 is, throughout its area, perpendicular to the center axis of the valve member 36 and to that of the equalizer valve casing member 82. It may also be noted that the sleeve portion 42 of the valve member 36 to which the pressure equalizer valve device 82 is assembled has an inside diameter which is uniform throughout the length of the axial bore in the sleeve portion 42. The inside diameter of the sleeve portion 42 of the valve member 36 is substantially equal to the outside diameter of the shank portion 92 of the equalizer valve casing member 82. If desired, the valve element 84 and spring seat member 86 may be constructed by a unitary member.

The valve element 84 is axially movable in the equalizer valve chamber 90 in the equalizer valve casing member in a first direction into a position seated on the annular valve seat 100 of the equalizer valve casing member 82 and in a second direction out of the position seated on the equalizer valve casing member 82. When moved in the first direction in the equalizer valve casing member 82 and seated on the annular valve seat 100 of the equalizer valve casing member 82, the valve element 84 blocks the communication between the orifice 98 and the equalizer valve chamber 90 in the equalizer valve casing member 82. When moved in the second direction and unseated from the annular valve sea 100 of the equalizer valve casing member 82, the valve element 84 allows communication between the orifice 98 and the equalizer valve chamber 90 in the equalizer valve casing member 82.

The valve element 84 is received on a shallowly dished end face of the spring seat member 86 which is also located within the equalizer valve chamber 90 in the equalizer valve casing member 82. The return spring 88 is seated at one end on the internal annular end face 58 of the land portion 40 of the valve member 36 and at the other on the annular opposite end face of the spring seat member 86. The spring seat member 86 and return spring 88 are thus operative to urge the valve element 84 to move in the first direction with respect to the equalizer valve casing member 82. As will be seen from FIG. 3, the spring seat member 86 has a generally triangular cross section forming three passageways 102 longitudinally extending in parallel with and symmetrically located about the center axis of the spring seat member 86. The passageways 102 thus formed by the spring seat member 86 provide constant communication axially across the spring seat member 86. Generally, the spring seat member provided in a pressure equalizer valve device according to the present invention may have a generally polygonal cross section forming three or more passageways longitudinally extending in parallel with and symmetrically located about the center axis of the spring seat member. The passage means defined by such a spring seat member is however simply by way of example and may be substituted by any other form of passageway means insofar as constant communication is provided axially across the spring seat member.

The modes of operation of the pressure equalizer valve device 80 thus constructed and arranged are essentially similar to those of the prior-art pressure equalizer valve device 62 described with reference to FIG. 1 and as such will not be herein described.

Figure 4:
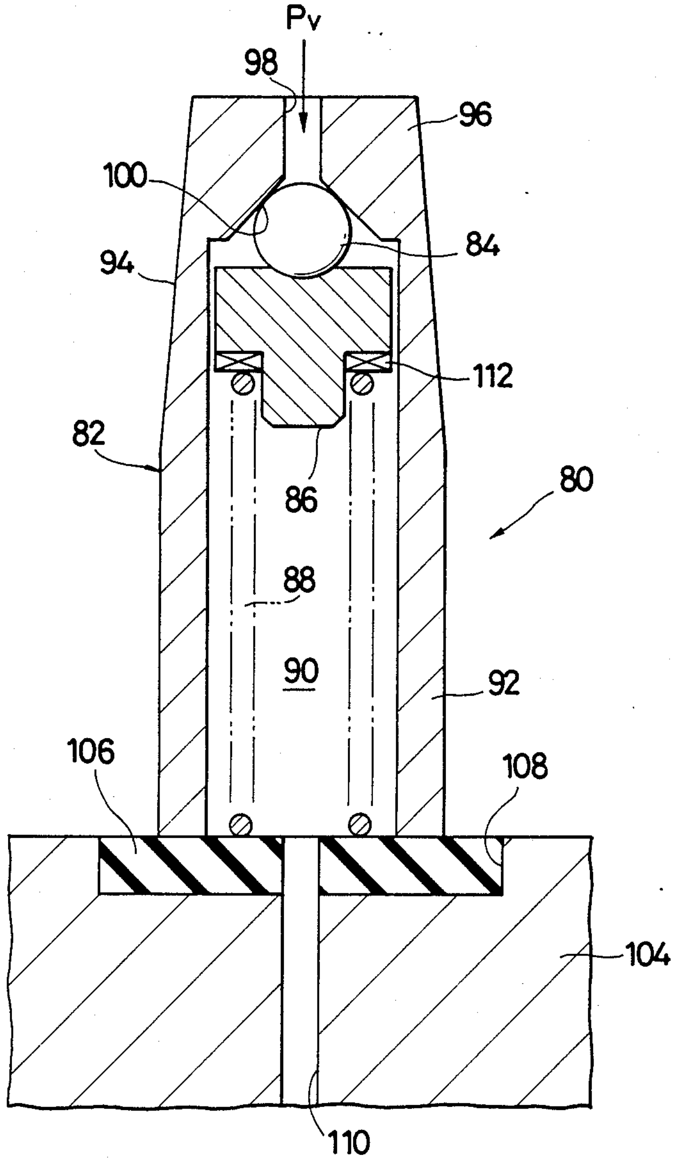
FIG. 4 is a longitudinal sectional view showing an example of the testing arrangement to determine the amount of preload to be imparted to a return spring used in the pressure equalizer valve device embodying the present invention before the pressure equalizer valve device is assembled to the fuel delivery valve assembly.

In the pressure equalizer valve device 80 embodying the present invention, the valve opening fluid pressure effective to cause the valve element 84 to move out of contact with the valve seat 100 of the equalizer valve casing member 82 depends on the force which the return spring 88 imparts to the valve element 84. Prior to assemblage of the pressure equalizer valve device 80 to the valve member 36, the amount of preload on the spring 88 is adjusted to enable the spring 88 to impart a proper force to the valve element 84 so that the pressure equalizer valve device 80 has a valve opening fluid pressure of a preselected value. FIG. 4 shows an example of the testing arrangement to determine the amount of preload to be imparted to the return spring 88 before the pressure equalizer valv.e device is assembled to the fuel delivery valve assembly 12.

Referring to FIG. 4, the amount of preload on the return spring 88 is determined through use of a testing plate 104 having a gasket member 106 closely received in a concavity 108 formed in the testing plate 104. The testing plate 104 is further formed with a passageway 110 which is open into the equalizer valve chamber 90 in the equalizer valve casing member 82 through the gasket member 106 and which ma communicate with a suitable fuel reservoir (not shown). It will be apparent that the outer face of the gasket member 106 is an equivalent to the internal annular end face 58 of the land portion 40 of the valve member 36. Arrangements are further made to provide communication between the orifice 98 in the equalizer valve casing member 82 and a suitable source (not shown) of a fuel pressure $P_V$ variable through the possible range of the fuel pressure which may be developed in the orifice 98 after the fuel delivery valve assembly 12 is closed.

With the pressure equalizer valve device 80 fitted to the testing plate 104 with the aid of any clamping means (not shown), the varying fuel pressure $P_V$ is directed into the orifice 98 in the equalizer valve casing member 82 to determine the pressure at which the valve element 84 is caused to move away from the annular valve seat 100 of the equalizer valve casing member 82. If the valve opening fluid pressure thus determined of the pressure equalizer valve device 80 is determined to be higher or lower than the preselected value, the return spring 88 may be exchanged with a spring having a smaller or larger spring constant and/or the spring seat member 86 may be exchanged with a spring seat member having different geometry. If desired, any preload adjusting element such as a shim 112 typically in the form of a thin annular member of metal may be attached to the inner annular end face of the spring seat member 86 to reduce the effective maximum length of the return spring 88 and thereby increase the amount of preload on the spring 88. The shim 112 may be placed on the internal annular end face 58 of the land portion 40 of the valve member 36 so as to intervene between the return spring 88 and the end face 58 of the land portion 40.

After the adjustment of the valve opening fluid pressure achievable by the pressure equalizer valve device 80 is in these manners complete, the pressure equalizer valve device 80 is removed from the testing plate 104. The pressure equalizer valve device 80 is then assembled to the valve member 36 of the fuel delivery valve assembly 12 with the shank portion 92 of the equalizer valve casing member 82 forced into the sleeve portion 42 of the valve member 36.

The equalizer valve casing member 82 forming part of the pressure equalizer valve device 80 is generally cylindrical in its entirety and need not be partially deformed when secured to the valve member 36. For these reasons, the equalizer valve casing member 82 of the pressure equalizer valve device 80 embodying the present invention can be constructed of a relatively hard rigid material which prevents deformation of the equalizer valve casing member as would otherwise be caused when the equalizer valve casing member 82 is forced into the valve member 36. It may also be noted that the end wall portion 96 formed with the annular valve seat 100 is sufficiently remote from the shank portion 92 forced into the valve member 36 and is for this reason reliably isolated from the stress which may be produced in the shank portion 92 of the equalizer valve casing member 82 during insertion of the shank portion 92 into the valve member 36.

Figure 3:
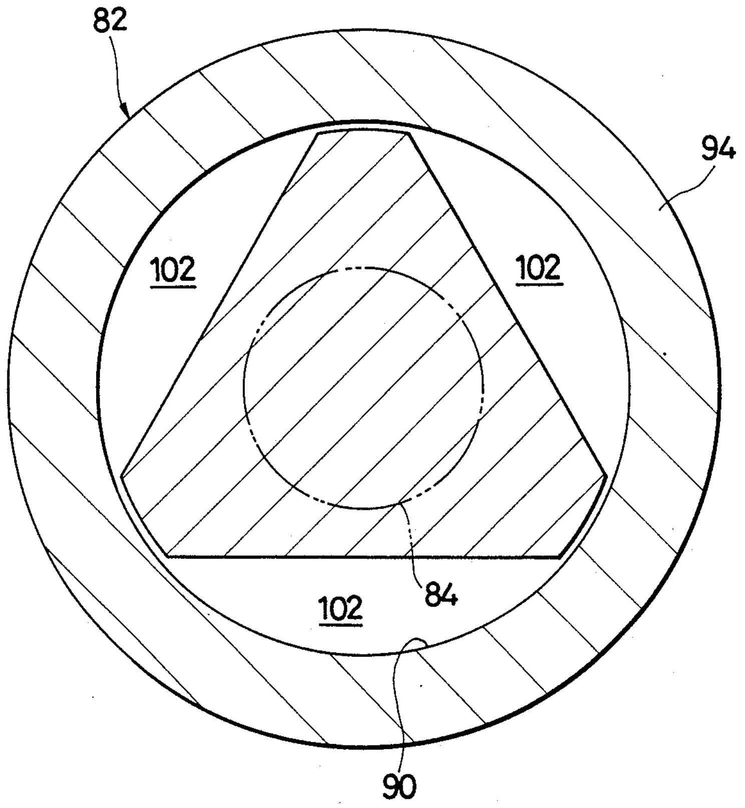
FIG. 3 is a cross sectional view taken along line III—III in FIG. 2.

FIGS. 5 to 9 show various modifications of the pressure equalizer valve device 80 hereinbefore described with reference to FIGS. 2 and 3.

Figure 5:
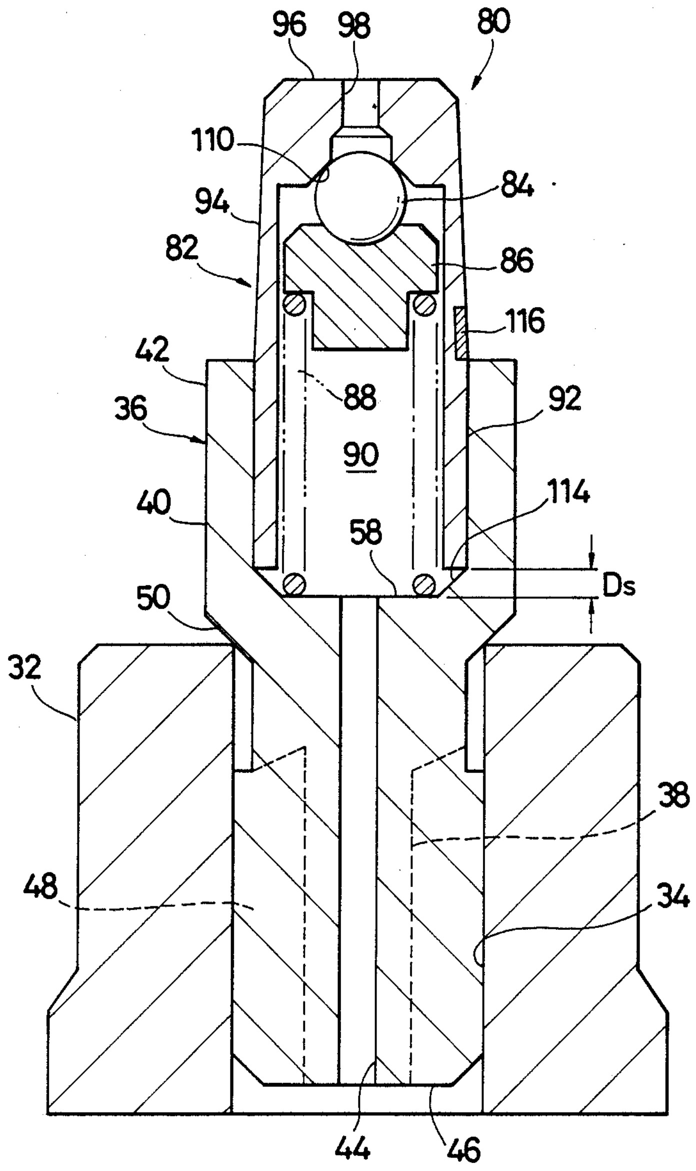
FIG. 5 is a longitudinal sectional view showing a modification of the pressure equalizer valve device incorporated in the fuel delivery valve assembly illustrated in FIG. 2.

In the fuel delivery valve assembly 12 including the pressure equalizer valve device 80 illustrated in FIG. 5, the valve member 36 of the fuel delivery valve assembly 12 has an internal tapered annular surface portion 114 radially tapered from the inner peripheral surface of the sleeve portion 42 to the internal annular end face 58 of the land portion 40 of the valve member 36. Thus, the axial bore or concavity in the sleeve portion 42 of the valve member 36 to which the pressure equalizer valve device 82 is assembled has a diameter which is uniform from the open end of the bore to the outer circumference of the internal tapered annular surface portion 114 and which is reduced from the outer circumference to the inner circumference of the surface portion 114. The inside diameter of the sleeve portion 42 of the valve member 36 is substantially equal to the outside diameter of the shank portion 92 of the equalizer valve casing member 82 as previously noted. The shank portion 92 of the equalizer valve casing member 82 is therefore allowed into the axial bore in the sleeve portion 42 of the valve member 36 until the leading end of the shank portion 92 reaches the outer circumference of the internal tapered annular surface portion 114 of the valve member 36 Thus, the shank portion 92 of the equalizer valve casing member 82 forced into the sleeve portion 42 of the valve member 36 has its leading end located short of the internal annular end face 58 of the land portion 40 of the valve member 36. In this manner, the internal tapered annular surface portion 114 of the valve member 36 or more specifically the outer circumference of the surface portion 114 provides means limiting the axial displacement of the equalizer valve casing member 82 forced into the sleeve portion 42 of the valve member 36.

When the equalizer valve casing member 82 is assembled to the sleeve portion 42 of the valve member 36, the helical compression return spring 88 in the equalizer valve casing member 82 is allowed to axially project slightly beyond the open end of the equalizer valve casing member 82 and is in this fashion seated at one end on the internal annular end face 58 of the land portion 40 of the valve member 36. If it happens that the return spring 88 is sidewise or radially deviated during insertion of the equalizer valve casing member 82 into the sleeve portion 42 of the valve member 36, the spring 88 will be initially received at its leading end on the internal tapered annular surface portion 114 of the valve member 36. As the equalizer valve casing member 82 is forced deeper into the sleeve portion 42 of the valve member 36, the leading end of the return spring 88 will be caused to slide on the tapered annular surface portion 114 toward the internal annular end face 58 of the land portion 40 of the valve member 36. By the time the equalizer valve casing member 82 is completely inserted into the sleeve portion 42 of the valve member 36 with its leading end located at the outer circumference of the tapered annular surface portion 114, the return spring 88 which was initially deviated laterally or radially is properly rectified or straightened and has its leading end correctly seated on the internal annular end face 58 of the land portion 40 of the valve member 36. In this manner, the internal tapered annular surface portion 114 of the land portion 40 also provides means for guiding the leading end of the return spring 88 correctly to the internal annular end face 58 of the land portion 40 of the valve member 36 if the spring 88 is sidewise or radially deviated during assemblage of the pressure equalizer valve device 80 to the valve member 36. Such guide means is useful for preventing the leading end of the return spring 88 from being seized between the shank portion 92 of the equalizer valve casing member 82 and the inner peripheral surface of the sleeve portion 42 of the valve member 36 while the equalizer valve casing member 82 is being inserted into the sleeve portion 42. This advantage of the tapered annular surface portion 114 will be more effective if the inner circumference of the surface portion 114 is sized to have a diameter substantially equal to the outside diameter which the return spring 88 will have when finally received on the internal annular end face 58 of the land portion 40 of the valve member 36.

It will be apparent that the amount of preload on the return spring 88 and accordingly the valve opening fluid pressure achievable by the pressure equalizer valve device 80 shown in FIG. 5 can also be adjusted with use of the testing arrangement described with reference to FIG. 4. In addition or as an alternative to such a manner of adjusting the valve opening fluid pressure achievable by the pressure equalizer valve device 80, the amount of preload on the return spring 88 may be adjusted through adjustment of the axial position of the equalizer valve casing member 82 with respect to the sleeve portion 42 of the valve member 36. For this purpose, any physically discernible feature such as a suitable form of marking indicative of a predetermined axial position of the equalizer valve casing member 82 with respect to the sleeve portion 42 of the valve member 36 may be applied to or formed on the outer peripheral surface of the tapered intermediate portion 94 of the equalizer valve casing member 82, as shown exaggerated at 116 in FIG. 5.

Figure 6:
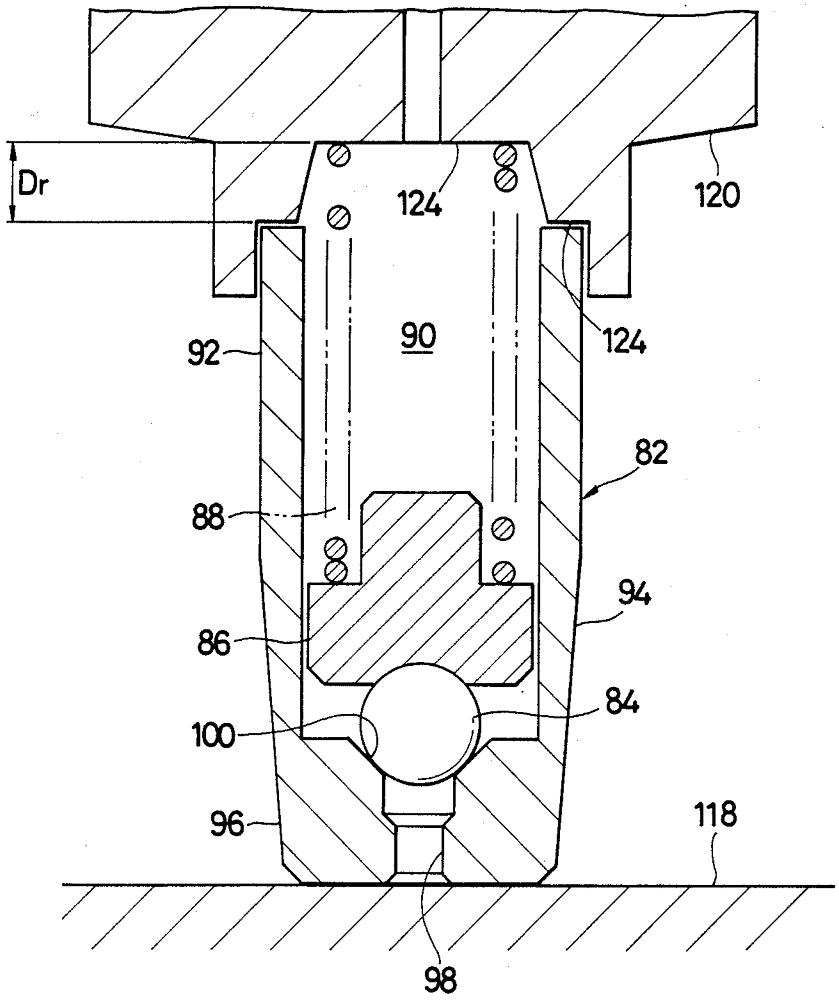
FIG. 6 shows anqther example of the testing arrangement which may be used for the determination of the amount of preload to be imparted to the return spring provided in the pressure equalizer valve device illustrated in FIG. 5.

FIG. 6 shows another example of the testing arrangement which may be used for the determination of the amount of preload on the return spring 88 in the pressure equalizer valve device 80 hereinbefore described with reference to FIG. 5.

In the testing arrangement herein shown is used a surface plate 118 having a flat horizontal upper face. The equalizer valve casing member 82 to form part of the pressure equalizer valve device 80 is placed on this surface plate 118 with its end wall portion 96 directed downwardly. The valve element 84, spring seat member 86 and compression spring 88 are then assembled in this sequence into the axial bore 90 in the equalizer valve casing member 82 so that the return spring 88 projects upwardly beyond the open upper end of the equalizer valve casing member 82. A jig member 120 is then mounted on the equalizer valve casing member 82 in a manner to receive the compression spring 88 at the upper end of the spring 88. The jig member 120 has an inner peripheral surface defining an annular end face 122 adapted to receive the upper end face of the equalizer valve casing member 82 so that the jig member 120 is supported on the equalizer valve casing member 82 in weight-transmitting relationship to the equalizer valve casing member 82. The jig member 120 further has a horizontal spring seat surface portion 124 which is located at a predetermined distance $D_r$ from the horizontal plane defined by the annular end face 122 of the jig member 120. This distance $D_s$ between the spring seat surface portion 124 and the horizontal plane defined by the annular end face 122 of the jig member 120 is equal to the axial length $L_t$ of the internal tapered annular surface portion 114 of the valve member 36 in the arrangement illustrated in FIG. 5.

The jig member 120 being thus supported on the equalizer valve casing member 82 with the compression spring 88 seated at its upper end on the spring seat surface portion 124 of the jig member 120, the spring 88 is axially compressed between the surface portion 124 and the spring seat member 86 within the equalizer valve casing member 82. The jig member 120 is urged upwardly by means of the spring 88 and is accordingly subjected to an upward force which varies with the amount of preload imparted to the spring 88. Through measurement of the force which the jig member 120 undergoes from the compression spring 88, the amount of preload on the spring 88 can be determined for evaluation. If the amount of preload on the spring 88 is determined to be larger or smaller than a prescribed proper value, the return spring 88 may be exchanged with a spring having a smaller or larger spring constant and/or the spring seat member 86 may be exchanged with a spring seat member having different geometry. In this instance, any preload adjusting element such as a shim may also be attached to the inner annular end face of the spring seat member 86 or to the internal annular end face 58 of the land portion 40 of the valve member 36 as has been described with reference to FIG. 4. After the adjustment of the amount of preload on the spring 88 is complete, the pressure equalizer valve device 80 including the spring 88 is assembled to the valve member 36 of the fuel delivery valve assembly 12 with the shank portion 92 of the equalizer valve casing member 82 forced into the sleeve portion 42 of the valve member 36 until the leading end of the shank portion 92 reaches the outer circumference of the internal tapered annular surface portion 114 of the valve member 36.

Figure 7:
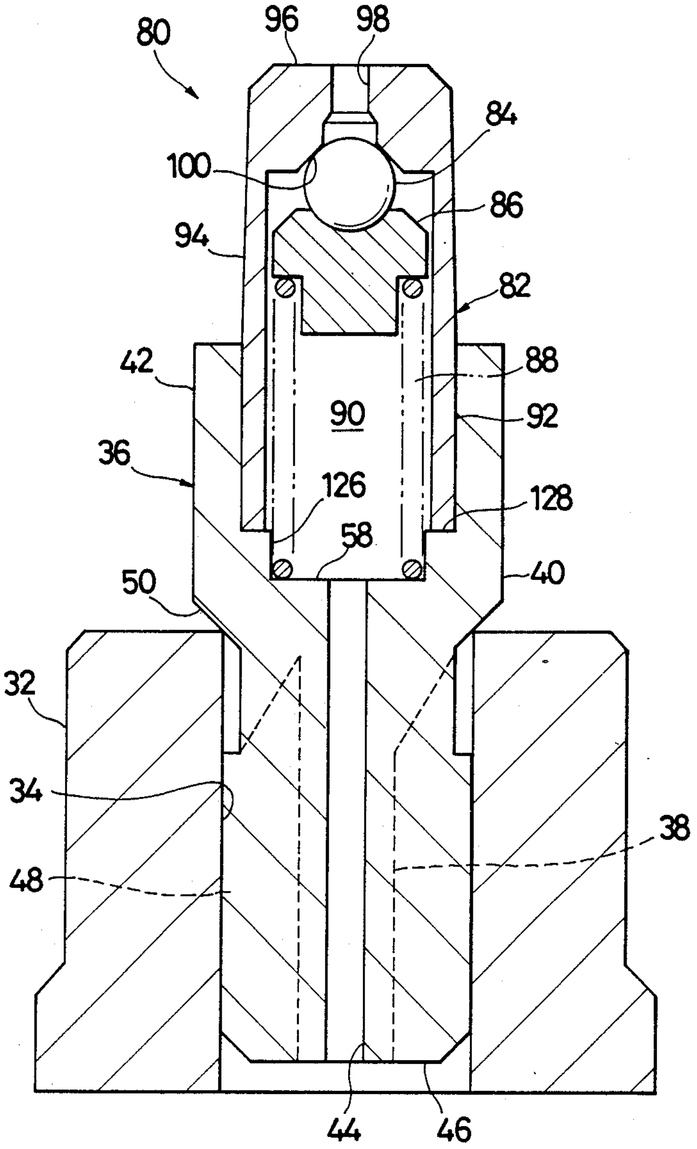
FIGS. 7 to 9 are views similar to FIG. 5 but show various other modifications of the pressure equalizer valve device included in the fuel delivery valve assembly illustrated in FIG. 2.

In the pressure equalizer valve device 80 illustrated in FIG. 7, the valve member 36 of the fuel delivery valve assembly 12 has an internal annular ledge portion 126 defining at one axial end thereof the internal annular end face 58 of the land portion 40 of the valve member 36 and at the other an internal annular end face 128 circumscribed by the inner peripheral surface of the sleeve portion 42 of the valve member 36. The internal annular end face 128 of the ledge portion 126 is located on a plane parallel with the internal annular end face 58 of the land portion 40 and axially spaced apart from the end face 58 toward the spring seat member 86. The shank portion 92 of the equalizer valve casing member 82 is forced into the axial bore in the sleeve portion 42 of the valve member 36 until the leading end of the shank portion 92 is received on the annular end face 126 of the ledge portion 126 of the valve member 36. Thus, the internal annular ledge portion 126 of the valve member 36 or more specifically the annular end face 126 of the ledge portion 126 also provides means limiting the axial displacement of the equalizer valve casing member 82 forced into the sleeve portion 42 of the valve member 36.

With the equalizer valve casing member 82 assembled in this manner to the valve member 36, the helical compression return spring 88 in the equalizer valve casing member 82 is allowed to axially project slightly beyond the open end of the equalizer valve casing member 82 and is in this fashion seated at one end on the internal annular end face 58 of the land portion 40 of the valve member 36. If it happens that the return spring 88 is sidewise or radially deviated during insertion of the equalizer valve casing member 82 into the sleeve portion 42 of the valve member 36, the spring 88 is forcibly admitted into a bore portion defined by the annular ledge portion 126 toward the surface portion 126 and is thereby properly received on the internal annular end face 58 of the land portion 40 of the valve member 36. In this manner, the internal annular ledge portion 126 of the valve member 36 also provides means for guiding the leading end of the return spring 88 correctly to the internal annular end face 58 of the land portion 40 of the valve member 36 if the spring 88 is sidewise or radially deviated during assemblage of the pressure equalizer valve device 80 to the valve member 36. As has been noted, such guide means is useful for preventing the leading end of the return spring 88 from being seized between the shank portion 92 of the equalizer valve casing member 82 and the inner peripheral surface of the sleeve portion 42 of the valve member 36 while the equalizer valve casing member 82 is being inserted into the sleeve portion 42. This advantage of the ledge portion 126 will be more effective if the inner circumference of the ledge portion 126 is sized to have a diameter substantially equal to the outside diameter which the return spring 88 will have when finally received on the internal annular end face 58 of the land portion 40 of the valve member 36.

It will be apparent that the amount of preload on the return spring 88 and accordingly the valve opening fluid pressure achievable by the pressure equalizer valve device 80 shown in FIG. 7 can also be adjusted with use of the testing arrangement described with reference to FIG. 5. After the adjustment of the amount of preload on the spring 88 is complete, the spring 88 is fitted to the valve member 36 through the bore portion defined by the ledge portion 126 and then the spring seat member 86 and the valve element 84 are received on the spring 88. The equalizer valve casing member 82 is thereafter assembled to the valve member 36 with the shank portion 92 of the equalizer valve casing member 82 forced into the sleeve portion 42 of the valve member 36 until the leading end of the shank portion 92 reaches the internal annular end face 128 of the valve member 36.

Figure 8:
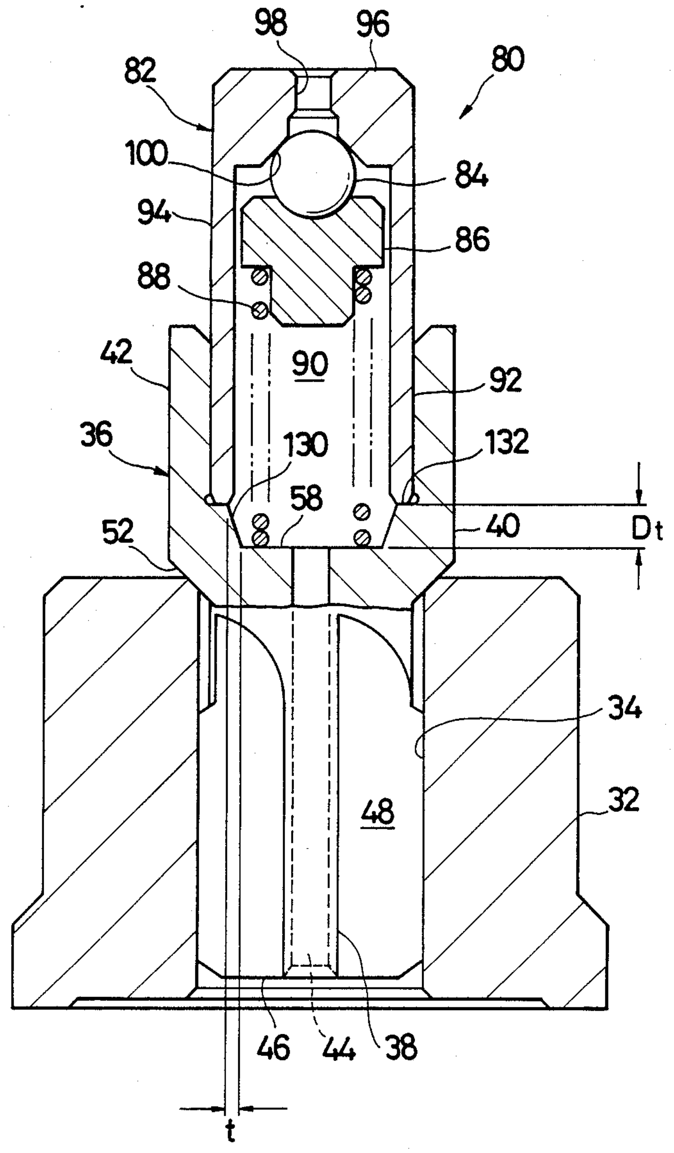

The pressure equalizer valve device 80 illustrated in FIG. 8 is characterized by the valve member 36 having an internal tapered annular surface portion 130 defining at one axial end thereof the internal annular end face 58 of the land portion 40 of the valve member 36 and at the other an internal annular end face 132 circumscribed by the inner peripheral surface of the sleeve portion 42 of the valve member 36. The annular surface portion 130 is radially tapered from the inner peripheral surface of the sleeve portion 42 to the internal annular end face 58 of the land portion 40 of the valve member 36. The internal annular end face 58 of the land portion 40 of the valve member 36 is thus circumscribed by the reduced-diameter axial end or inner circumference of the tapered annular surface portion 130.

The end face 132 of the tapered annular surface portion 130 is located on a plane parallel with the internal annular end face 58 of the land portion 40 and axially spaced apart a distance $D_t$ from the end face 58 toward the spring seat member 86. The shank portion 92 of the equalizer valve casing member 82 is forced into the axial bore in the sleeve portion 42 of the valve member 36 until the leading end of the shank portion 92 is received on the internal annular end face 132 of the valve member 36. Thus, the internal annular end face 132 of the valve member 36 also provides means limiting the axial displacement of the equalizer valve casing member 82 forced into the sleeve portion 42 of the valve member 36.

With the equalizer valve casing member 82 assembled in this manner to the sleeve portion 42 of the valve member 36, the helical compression return spring 88 in the equalizer valve casing member 82 is allowed to axially project slightly beyond the open end of the equalizer valve casing member 82 and is in this fashion seated at one end on the internal annular end face 58 of the land portion 40 of the valve member 36. If it happens that the return spring 88 is sidewise or radially deviated during insertion of the equalizer valve casing member 82 into the sleeve portion 42 of the valve member 36, the spring 88 will be initially received at its leading end on the tapered annular surface portion 130 of the valve member 36. As the equalizer valve casing member 82 is forced deeper into the sleeve portion 42 of the valve member 36, the leading end of the return spring 88 will be caused to slide on the tapered annular surface portion 130 toward the internal annular end face 58 of the land portion 40 of the valve member 36. By the time the equalizer valve casing member 82 is completely inserted into the sleeve portion 42 of the valve member 36 with its leading end located on the annular end face 132, the return spring 88 which was initially deviated laterally or radially is properly rectified and has its leading end correctly seated on the internal annular end face 58 of the land portion 40 of the valve member 36. In this manner, the internal tapered annular surface portion 130 of the land portion 40 also provides means for guiding the leading end of the return spring 88 correctly to the internal annular end face 58 of the land portion 40 of the valve member 36 if the spring 88 is sidewise or radially deviated during assemblage of the pressure equalizer valve device 80 to the valve member 36. The guide means is thus also useful for preventing the leading end of the return spring 88 from being seized between the shank portion 92 of the equalizer valve casing member 82 and the inner peripheral surface of the sleeve portion 42 of the valve member 36 while the equalizer valve casing member 82 is being inserted into the sleeve portion 42. For the reason previously explained, the inner circumference of the surface portion 130 is preferably sized to have a diameter substantially equal to the outside diameter which the return spring 88 will have when finally received on the internal annular end face 58 of the land portion 40 of the valve member 36. The amount of preload on the return spring 88 and accordingly the valve opening fluid pressure achievable by the pressure equalizer valve device 80 shown in FIG. 8 can also be adjusted with use of the testing arrangement described with reference to FIG. 5.

The internal tapered annular surface portion 130 which the valve member 36 has in conjunction with the pressure equalizer valve device 80 is further advantageous in that the return spring 88 assembled into the equalizer valve casing member 82 is radially spaced apart wider from the inner peripheral surface of the equalizer valve casing member 82. When the return spring 88 is compressed by the valve element 84 under the fuel pressure developed in the orifice 98, the return spring 88 may be caused to laterally buckle and might be brought into sliding contact with the inner peripheral surface of the equalizer valve casing member 82. A sliding friction repeatedly caused by such contact between the spring 88 and the inner peripheral surface of the equalizer valve casing member 82 will promote wear and abrasion of the spring 88 and may result in deviation of the performance characteristics of the spring from those adjusted during assemblage of the pressure equalizer valve device 80. The return spring 88 provided in the pressure equalizer valve device 80 hereinbefore described with reference to FIG. 8 is however spaced apart wider from the inner peripheral surface of the equalizer valve casing member 82, there is practically no likelihood of the spring 88 being brought into contact with the equalizer valve casing member 82 if the spring 88 is caused to buckle during compression. The internal tapered annular surface portion 130 is formed to have an amount of taper t selected to achieve an additional advantage most effectively.

Figure 9:
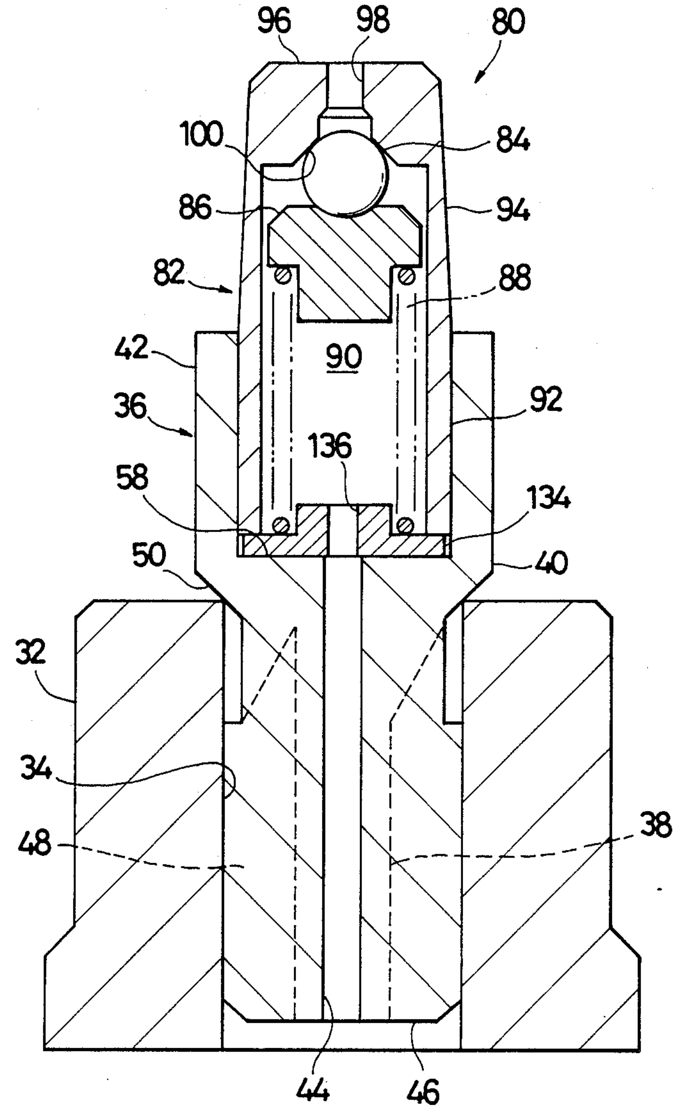

The pressure equalizer valve device 80 illustrated in FIG. 9 is characterized by inclusion of an additional spring seat member 134 received on the internal annular end face 58 of the land portion 40 of the valve member 36. The spring seat member 134 is formed with a center opening 136 open at one end to the equalizer valve chamber 90 in the equalizer valve casing member 82 and aligned with and open at the other end to the fuel return passageway 44 in the stem portion 38 of the valve member 36. The return spring 88 is seated at one end on the annular end face of the spring seat member 86 engaging the valve element 84 and at the other on this additional spring seat member 134 received on the internal annular end face 58 of the land portion 40 of the valve member 36.

The shank portion 92 of the equalizer valve casing member 82 is forced into the axial bore in the sleeve portion 42 of the valve member 36 until the leading end of the shank portion 92 is received on the additional spring seat member 134. Thus, the additional spring seat member 134 provides means limiting the axial displacement of the equalizer valve casing member 82 forced into the sleeve portion 42 of the valve member 36. If desired, the equalizer valve casing member 82 for use with the additional spring seat member 134 may be inserted into the axial bore in the sleeve portion 42 of the valve member 36 to an axial position having its leading end located short of the internal annular end face 58 of the land portion 40 of the valve member 36 as indicated by phantom lines in FIG. 9.

The equalizer valve casing member 82 is forced into the valve member 36 after the additional spring seat member 134 and the return spring 88 are fitted into the valve member 36 and, for this reason, the return spring 88 could not have its leading end seized between the shank portion 92 of the equalizer valve casing member 82 and the inner peripheral surface of the sleeve portion 42 of the valve member 36 while the equalizer valve casing member 82 is being inserted into the sleeve portion 42 of the valve member 36.

It will be apparent that the amount of preload on the return spring 88 and accordingly the valve opening fluid pressure achievable by the pressure equalizer valve device 80 shown in FIG. 9 can also be adjusted with use of the testing arrangement described with reference to FIG. 4.

As will have been understood from the foregoing description, the valve opening fluid pressure and engagement between the valve element 84 and spring sea member 86 in each of the preferred embodiments of a pressure equalizer valve device according to the present invention can be easily examined and accurately adjusted before the individual component parts of the pressure equalizer valve device 80 are assembled together or fitted into the valve member 36 of the fuel delivery valve assembly 12.

The present invention further contemplates provision of a pressure equalizer valve device in which an adequate space is provided for the accommodation of the helical compression spring of the pressure equalizer valve device within the fuel delivery valve assembly and, in addition, the spring accommodated within the fuel delivery valve assembly is effectively precluded from being caused to buckle and brought into sliding contact with the inner peripheral surface of the valve member.

Figure 10:
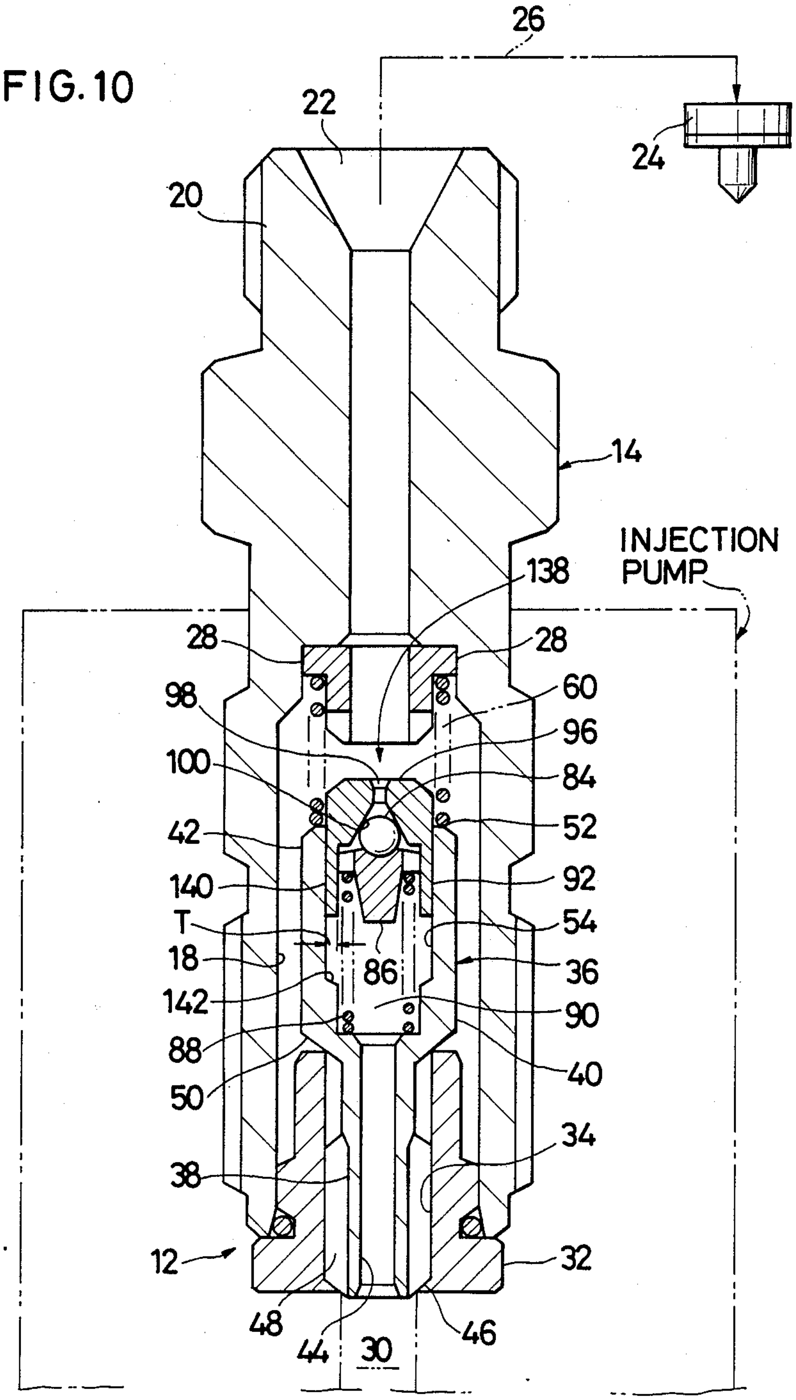
FIG. 10 is a longitudinal sectional view showing a fuel delivery valve assembly forming part of a fuel injection pump and including another preferred embodiment of a pressure equalizer valve device according to the present invention.

FIG. 10 shows a preferred embodiment of a pressure equalizer valve device according to the present invention to achieve such a purpose.

Referring to FIG. 10, the pressure equalizer valve device, now designated by reference numeral 138, comprises an equalizer valve casing member 140 having a shank portion 92 and an end wall portion 94 formed with an orifice 98 and a valve seat surface portion 100 engaged by the valve element 84. The equalizer valve casing member 140 provided in the pressure equalizer valve device 138 herein shown is thus devoid of the tâpered intermediate axial portion 94 of the equalizer valve casing member 82 used in each of the embodiments hereinbefore described. The valve member 36 of the fuel delivery valve assembly 12 to which such an equalizer valve casing member 140 is assembled has a first inner peripheral surface portion defining a cylindrical axial bore portion of the axial concavity or equalizer valve chamber 90 in the sleeve portion 42 of the valve member 36. The valve member 36 further has a flat internal surface portion 58 located at the inner end of the equalizer valve chamber 90, a second inner peripheral surface portion defining another cylindrical axial bore portion of the equalizer valve chamber 90 in the sleeve portion 42 of the valve member 36. The valve member 36 further has an internal tapered annular surface portion 142 axially intermediate between the first and second inner peripheral surface portions of the valve member 36. The tapered annular surface portion 142 is radially tapered directly from the first inner peripheral surface portion to the second inner peripheral surface portion of the valve member 36. As in each of the embodiments of the present invention hereinbefore described with reference to FIGS. 5 and 8, the tapered annular surface portion 142 is effective to allow the helical compression return spring 88 to slide at one end thereof on the surface portion 142 when the spring 88 is being fitted into the valve member 36 during assemblage of the pressure equalizer valve device 138 to the fuel delivery valve assembly 12.

The return spring 88 extends into the cylindrical axial bore portion defined by the second inner peripheral surface of the sleeve portion 42 of the valve member 36 and is seated at one end on the spring seat member 86 engaging the valve element 84 and at the other on the flat internal surface portion 58 of the valve member 36. The equalizer valve casing member 140 is fitted to the valve member 36 with its shank portion 91 axially forced into the cylindrical axial bore portion defined by the first inner peripheral surface of the sleeve portion 42 of the valve member 36 and has its inner end located short of the tapered annular surface portion 142 of the valve member 36 as shown.

Thus, the pressure equalizer valve device 138 included in the arrangement shown in FIG. 10 is characterized in that (a) the equalizer valve casing member 140 is axially spaced apart from the flat internal surface portion 58 of the valve member 36 to provide an adequate distance between the spring seat member 86 and the flat internal surface portion 58;

(b) the helical compression return spring 88 is accommodated in part in the equalizer valve casing member 140 and in part within the equalizer valve chamber 90 in the sleeve portion 42 of the valve member 36 and has a significantly shortened intermediate portion which may be caused to buckle;

(c) the intermediate portion of the return spring 88 is spaced apart sufficiently from the first inner peripheral surface of the sleeve portion 42 of the valve member 36 due to the presence of the shank portion 92 of the equalizer valve casing member 140 radially intervening between the spring 88 and the sleeve portion 42 of the valve member 36 and is for this reason unlikely to be brought into sliding contact with the first inner peripheral surface of the sleeve portion 42 when the spring 88 is fitted into the valve member 36 during assemblage of the pressure equalizer valve device 138 to the fuel delivery valve assembly 12;

(d) if the return spring 88 happens to be sidewise or radially deformed when being fitted into the valve member 36 during assemblage of the pressure equalizer valve device 138 to the fuel delivery valve assembly 12, the tapered annular surface portion 142 of the sleeve portion 42 of the valve member 36 allows the return spring 88 to slide at one end thereof on the surface portion 142.

While various preferred embodiments of a pressure equalizer valve device according to the present invention have thus far been described and shown, it should be borne in mind that such embodiments are merely by way of example and are thus subject to change and modification in numerous respects if and where desired.

What is claimed is:

1. A pressure equalizer valve device incorporated in a fuel delivery valve assembly for use in a fuel injection pump, the fuel delivery valve assembly having a valve chamber and a delivery valve member axially movable in part within the valve chamber, the delivery valve member having an axially elongated concavity which is open at one end of the delivery valve member, the pressure equalizer valve device comprising (a) a hollow equalizer valve casing member which has an axial end portion closely received in said axially elongated concavity and which is thereby fixedly secured to said delivery valve member, said casing member having a valve seat surface portion and a valve chamber open in said delivery valve member, (b) an equalizer valve element movable into and out of a position seated on said valve seat surface portion, and (c) biasing means engaging said equalizer valve element and located in part within said delivery valve member for urging said equalizer valve element against said valve seat surface portion of said equalizer valve casing member, (d) wherein said equalizer valve element and at least a portion of said biasing means are accommodated within the valve chamber in said equalizer valve casing member.

2. A pressure equalizer valve device as set forth in claim 1, in which said biasing means comprises (c/1) a spring seat member engaging said equalizer valve element, and (c/2) a helical compression spring seated at one end on said spring seat member and at the other in the vicinity of the axially innermost end of said elongated concavity in said delivery valve member for urging said equalizer valve element against said valve seat surface portion of said equalizer valve casing member.

3. A pressure equalizer valve device incorporated in a fuel delivery valve assembly for use in a fuel injection pump, the fuel delivery valve assembly having a valve chamber and a delivery valve member axially movable in part within the valve chamber, the delivery valve member having an axially elongated concavity which is open at one end of the delivery valve member, the pressure equalizer valve device comprising (a) a hollow equalizer valve casing member which has an axial end portion closely received in said axially elongated concavity and which is thereby fixedly secured to said delivery valve member, said casing member having a valve seat surface portion and a valve chamber open in said delivery valve member, (b) an equalizer valve element movable into and out of a position seated on said valve seat surface portion, (c) a spring seat member engaging and movable with said equalizer valve element, and (d) a helical compression spring seated at one end on said spring seat member and at the other within said delivery valve member for urging said equalizer valve element against said valve seat surface portion of said equalizer valve casing member, (e) wherein said equalizer valve element, said spring seat member and at least an axial portion of said helical compression spring are all accommodated within the valve chamber in said equalizer valve casing member.

4. A pressure equalizer valve device as set forth in claim 3, in which said pressure equalizer valve device further comprises a displacement limiting surface portion limiting the axial displacement of the equalizer valve casing member with respect to said axially elongated concavity in said delivery valve member in a direction opposite to the direction in which the casing member axially extends into said elongated concavity, said equalizer valve casing member being held in axially abutting engagement with said displacement limiting surface portion at its end opposite to said valve seat surface portion.

5. A pressure equalizer valve device as set forth in claim 4, in which said displacement limiting surface portion comprises a substantially flat internal surface portion which said delivery valve member has at one end of said axial concavity, said helical compression spring being seated at one end on said spring seat member and at the other on said flat internal surface portion.

6. A pressure equalizer valve device as set forth in claim 4, in which said delivery valve member has an inner peripheral surface portion defining a cylindrical portion of said axial concavity, a substantially flat internal surface portion located at one end of said axial concavity, and an internal tapered annular surface portion axially intermediate between said inner peripheral surface portion and said flat internal surface portion and radially tapered away from said inner peripheral surface portion toward said flat internal surface portion, said tapered annular surface portion being directly contiguous at one of its ends to said flat internal surface portion and being effective to allow said helical compression spring to slide at one end thereof on the tapered annular surface portion when the spring is being fitted to said delivery valve member during assemblage of the pressure equalizer valve device to the fuel delivery valve assembly.

7. A pressure equalizer valve device as set forth in claim 6, in which said tapered annular surface portion is radially tapered directly from said inner peripheral surface portion of said delivery valve member toward said flat internal surface portion of the delivery valve member.

8. A pressure equalizer valve device as set forth in claim 6, in which said tapered annular surface portion is radially tapered directly from said inner peripheral surface portion of said delivery valve member and terminates directly at said flat internal surface portion of the delivery valve member.

9. A pressure equalizer valve device as set forth in claim 6, in which said tapered annular surface portion is radially tapered away from said inner peripheral surface portion of said delivery valve member and terminates directly at said flat internal surface portion of the delivery valve member.

10. A pressure equalizer valve device as set forth in claim 6, in which said helical compression spring is seated at one end on said spring seat member and at the other on said flat internal surface portion of said delivery valve member, wherein said tapered annular surface portion is radially tapered directly from said inner peripheral surface portion of said delivery valve member toward said flat internal surface portion of the delivery valve member and has an outer circumference directly contiguous to the inner peripheral surface portion of said delivery valve member, and wherein said displacement limiting means comprises the outer circumference of said tapered annular surface portion.

11. A pressure equalizer valve device as set forth in claim 6, in which said helical compression spring is seated a one end on said spring seat member and at the other on said flat internal surface portion of said delivery valve member, wherein said delivery valve member further has an internal annular surface portion radially intervening between said inner peripheral surface portion of the delivery valve member and said tapered annular surface portion, and wherein said displacement limiting surface portion comprises said internal annular surface portion intervening between said inner peripheral surface portion of the delivery valve member and said tapered annular surface portion.

12. A pressure equalizer valve device as set forth in claim 11, in which said internal annular surface portion of said delivery valve member is defined on a plane substantially parallel with said flat internal surface portion of the delivery valve member and axially spaced apart from the flat internal surface portion toward said spring seat member so that said helical compression spring is allowed to axially project slightly beyond the axial end of said equalizer valve casing member opposite to said valve seat surface portion of the equalizer valve casing member.

13. A pressure equalizer valve device as set forth in claim 5, in which said helical compression spring is seated at one end on said spring seat member and at the other on said flat internal surface portion of said delivery valve member, wherein said delivery valve member further has an inner peripheral surface portion defining a cylindrical portion of said axial concavity and an internal annular surface portion radially extending inwardly from one axial end of said inner peripheral surface portion of the delivery valve member, and wherein said displacement limiting means comprises said internal annular surface portion of the delivery valve member.

14. A pressure equalizer valve device as set forth in claim 13, in which said internal annular surface portion of said delivery valve member is defined on a plane substantially parallel with said flat internal surface portion of the delivery valve member and axially spaced apart from the flat internal surface portion toward said spring seat member so that said helical compression spring is allowed to axially project slightly beyond the axial end of said equalizer valve casing member opposite to said valve seat surface portion of the equalizer valve casing member.

15. A pressure equalizer valve device as set forth in claim 3, further comprising an additional spring seat member held in place within said delivery valve member, said helical compression spring being seated at one end on said spring seat member engaging said equalizer valve element and at the other on said additional spring seat member, said displacement limiting mean comprising a surface portion of said additional spring seat member.

16. A pressure equalizer valve device incorporated in a fuel delivery valve assembly for use in a fuel injection pump, the fuel delivery valve assembly having a valve chamber and a delivery valve member axially movable in part within the valve chamber, the pressure equalizer valve device comprising (a) a hollow equalizer valve casing member secured to said delivery valve member and having a valve seat surface portion and a valve chamber open in said delivery valve member, (b) an equalizer valve element movable into and out of a position seated on said valve seat surface portion, (c) a spring seat member engaging and movable with said equalizer valve element, and (d) a helical compression spring seated at one end on said spring seat member and at the other within said delivery valve member for urging said equalizer valve element against said valve seat surface portion of said equalizer valve casing member, (e) wherein said equalizer valve element, said spring seat member and said helical compression spring are all accommodated within the valve chamber in said equalizer valve casing member; and wherein the delivery valve member of said fuel delivery valve assembly is formed with an axial concavity having an axial portion of said equalizer valve casing member closely received therein, said pressure equalizer valve device further comprising displacement limiting means limiting the axial displacement of the equalizer valve casing member within said axial concavity in said delivery valve member, said equalizer valve casing member being held in axially abutting engagement with said displacement limiting means at its end opposite to said valve seat surface portion; and wherein said displacement limiting means comprises a substantially flat internal surface portion which said delivery valve member has at one end of said axial concavity, said helical compression spring being seated at one end on said spring seat member and at the other on said flat internal surface portion; and wherein said flat internal surface portion has a diameter substantially equal to the outside diameter of said helical compression spring.

17. A pressure equalizer valve device as set forth in claim 1, in which said equalizer valve casing member has a physically discernible feature indicative of a predetermined axial position of said equalizer valve casing member with respect to said delivery valve member.

18. A pressure equalizer valve device incorporated in a fuel delivery valve assembly for use in a fuel injection pump, the fuel delivery valve assembly having a valve chamber and a delivery valve member axially movable in part within the valve chamber, the pressure equalizer valve device comprising (a) a hollow equalizer valve casing member secured to said delivery valve member and having a valve seat surface portion, (b) an equalizer valve element movable into and out of a position seated on said valve seat surface portion, (c) a spring seat member engaging said equalizer valve element, and (d) a helical compression spring seated at one end on said spring seat member and at the other within said delivery valve member for urging said equalizer valve element against said valve seat surface portion of said equalizer valve casing member, (e) wherein said equalizer valve element and said spring seat member are accommodated within said equalizer valve casing member and said helical compression spring is accommodated in part within said equalizer valve casing member and axially projects out of the equalizer valve casing member into said delivery valve member, and the delivery valve member is formed with an axial concavity having said equalizer valve casing member closely and fixedly received therein.

19. A pressure equalizer valve device as set forth in claim 18, wherein said delivery valve member has a first inner peripheral surface portion defining a cylindrical axial portion of said axial concavity in said delivery valve member, a substantially flat internal surface portion located at one end of said axial concavity, and a second inner peripheral surface portion contiguous at one axial end to said flat internal surface portion and smaller in diameter than said first inner. peripheral surface portion of said delivery valve member, said second inner peripheral surface portion defining another cylindrical axial portion of said axial concavity, said equalizer valve casing member having a cylindrical wall portion axially extending toward said flat internal surface portion of said delivery valve member, said helical compression spring having an axial end portion received in said cylindrical wall portion of said equalizer valve casing member, another axial end portion received in the cylindrical wall portion defined by said second inner peripheral surface portion of said delivery valve member, and a longitudinally intermediate axial portion radially spaced apart from said first inner peripheral surface portion of said delivery valve member.

20. A pressure equalizer valve device as set forth in claim 18, wherein said delivery valve member has a first inner peripheral surface portion defining a cylindrical axial portion of said axial concavity in said delivery valve member, a substantially flat internal surface portion located at one end of said axial concavity, a second inner peripheral surface portion contiguous at one axial end to said flat internal surface portion and smaller in diameter than said first inner peripheral surface portion of said delivery valve member, said second inner peripheral surface portion defining another cylindrical axial portion of said axial concavity, and an internal tapered annular surface portion radially tapered from said first inner peripheral surface portion to said second inner peripheral surface portion of the valve member.

21. A pressure equalizer valve device as set forth in claim 20, in which said tapered annular surface portion of said delivery valve member is radially tapered directly from said first inner peripheral surface portion to said second inner peripheral surface portion of said delivery valve member.

22. A pressure equalizer valve device as set forth in claim 20, in which said helical compression spring axially extends into the cylindrical axial portion defined by said second inner peripheral surface of said delivery valve member and is seated at on end on said spring seat member and at the other on said flat internal surface portion of the valve member.

23. A pressure equalizer valve device as set forth in claim 22, in which said equalizer valve casing member is in part axially received in the cylindrical axial portion defined by said first inner peripheral surface of said delivery valve member and has its leading end located short of said tapered annular surface portion of said valve member.

* * * * *